(12) United States Patent
Uratani et al.

(10) Patent No.: US 8,962,201 B2
(45) Date of Patent: Feb. 24, 2015

(54) FUEL CELL APPARATUS

(75) Inventors: Shoichi Uratani, Kawachinagano (JP); Nobuhisa Ishida, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 273 days.

(21) Appl. No.: 13/498,497

(22) PCT Filed: Sep. 3, 2010

(86) PCT No.: PCT/JP2010/065113
§ 371 (c)(1),
(2), (4) Date: Mar. 27, 2012

(87) PCT Pub. No.: WO2011/040182
PCT Pub. Date: Apr. 7, 2011

(65) Prior Publication Data
US 2012/0183870 A1 Jul. 19, 2012

(30) Foreign Application Priority Data
Sep. 30, 2009 (JP) .................. 2009-226795

(51) Int. Cl.
*H01M 8/18* (2006.01)
*H01M 8/06* (2006.01)
*H01M 8/04* (2006.01)
*C01B 3/34* (2006.01)

(52) U.S. Cl.
CPC .......... *H01M 8/065* (2013.01); *H01M 8/04753* (2013.01); *H01M 8/186* (2013.01); *H01M 8/04544* (2013.01); *H01M 8/04216* (2013.01); *H01M 8/04776* (2013.01); *C01B 3/34* (2013.01); *C01B 2203/0216* (2013.01); *C01B 2203/0233* (2013.01); *C01B 2203/0244* (2013.01); *C01B 2203/0283* (2013.01); *C01B 2203/043* (2013.01); *C01B 2203/0475* (2013.01); *C01B 2203/062* (2013.01); *C01B 2203/148* (2013.01); *Y02E 60/528* (2013.01)
USPC .......................................... 429/418; 429/419

(58) Field of Classification Search
USPC .......................................... 429/417, 418, 419
See application file for complete search history.

(56) References Cited

U.S. PATENT DOCUMENTS

| 4,204,033 A | 5/1980 | Meissner |
|---|---|---|
| 5,492,777 A | 2/1996 | Isenberg et al. |
| 2004/0126632 A1 | 7/2004 | Pearson et al. |

(Continued)

FOREIGN PATENT DOCUMENTS

| JP | 2007-145686 | 6/2007 |
|---|---|---|
| JP | 2009-62215 | 3/2009 |
| JP | 2009-99491 | 5/2009 |

*Primary Examiner* — Mark F Huff
*Assistant Examiner* — Monique Wills
(74) *Attorney, Agent, or Firm* — Cozen O'Connor (57) ABSTRACT

Disclosed is a fuel cell apparatus which can continue stable performance, can generate an electric power for a long period, and has a long service life. The fuel cell apparatus comprises: a fuel cell body comprising a power generation unit which can generate an electric power through the reaction between hydrogen and oxygen and a hydrogen generation member which can generate hydrogen through the reaction with water produced upon the generation of the electric power and can supply hydrogen generated to the power generation unit; and a reduction control unit which can control so as to reduce the hydrogen generation member that has been oxidized through the reaction with the produced water.

17 Claims, 3 Drawing Sheets

(56) References Cited

U.S. PATENT DOCUMENTS

2004/0202914 A1* 10/2004 Sridhar et al. .................. 429/34
2007/0275272 A1* 11/2007 Muramatsu ....................... 429/9
2009/0123797 A1* 5/2009 Kaye et al. ...................... 429/17

* cited by examiner

FUEL CELL APPARATUS

This is a U.S. National Phase Application under 35 USC 371 of International Application PCT/JP2010/065113 filed on Sep. 3, 2010.

This application claims the priority of Japanese Application No. 2009-226795 filed Sep. 30, 2009, the entire content of which is hereby incorporated by reference.

TECHNICAL FIELD

The present invention relates to a fuel cell apparatus, and more particularly, to a fuel cell apparatus which includes a hydrogen producing member.

BACKGROUND ART

In recent years, portable electronic devices, such as cellular phones, personal digital assistants, note type personal computers, portable audios, and portable visual instruments, have been developed in terms of multiple functions and high performance. With such development, demands for a larger capacity of battery cells for drive power for the above devices have been increased. Conventionally, as such battery cells for drive power for the above portable electronic devices, lithium batteries and nickel-cadmium batteries are used. However, the respective capacities of these batteries approach the limit, and a dramatic increase in the capacity may not be expected. Then, instead of such lithium batteries and nickel-cadmium batteries, fuel cells which have high energy density and a possibility for a larger capacity are developed actively.

Further, fuel cells generate electric power from hydrogen and oxygen in air, and efficiency in generating electric power theoretically is high. Accordingly, the fuel cells can save energy. In addition, since fuel cells discharge only water as excretions at the time of generation of electricity, and do not discharge carbon dioxides and nitrogen oxides, they are evaluated as a eco-friendly power generating method. Consequently, the fuel cells are expected as a powerful card for solving energy and environment concern on a global basis.

Such a fuel cell has typically the following structure. A solid polymer electrolyte membrane which employs a solid polymer ion exchange membrane, a solid oxide electrolyte membrane which employs yttria-stabilized zirconia (YSZ), or the like is sandwiched between a fuel electrode and an air electrode (oxygen electrode), and the resulting laminated structure is further sandwiched between a pair of separators so as to form one cell. Further, in the cell, a hydrogen flow passage and an air flow passage are disposed. The hydrogen flow passage is configured to supply hydrogen as one example of fuel gas to the fuel electrode, and the air flow passage is configured to supply air to the air electrode. When hydrogen and air (oxygen) are supplied through these flow passages to the fuel electrode and the air electrode respectively, electricity is generated by an electrochemical reaction.

However, the fuel cell needs infrastructure development for supplying fuel, for example, hydrogen. Further, in methanol which is comparatively easily available as a fuel, there is a problem that it takes years to establish a distribution system for methanol.

Then, in order to cope with such problems, Patent Document 1 teaches a technique to dispose in a fuel cell body a hydrogen producing member which produces hydrogen by making predetermined metal fine particles react with water, and to supply the hydrogen produced by this hydrogen producing member to a fuel electrode. According to this technique, water produced by electricity generation in the fuel cell body is supplied as water required for hydrogen generation. Accordingly, it is not required to carry water required for hydrogen generation. The hydrogen produced by the hydrogen producing member is supplied to the fuel electrode, and then, in the fuel electrode, the supplied hydrogen is oxidized so as to generate electricity, whereby water is reproduced again, and the above cyclical processes are utilized. As a result, it is not required to supply hydrogen from the outside, and it becomes possible to continue the electricity generating action.

RELATED ART DOCUMENT

Patent Document

Patent Document No. 1: Japanese Unexamined Patent Publication No. 2009-99491 official report

SUMMARY OF INVENTION

Problems to be Solved by the Invention

However, in the structure described in Patent Document 1, with the generation of electricity, the oxidation of the hydrogen producing member progresses, and then, the hydrogen generating ability decreases. For example, in the case where iron (Fe) is used as the hydrogen producing member, as shown in the following Formula (2), iron (Fe) changes to iron oxide ($Fe_3O_4$) through a reaction with water ($H_2O$), and then, the percentage of iron (Fe) in the hydrogen producing member decreases. Accordingly, eventually, the fuel cell suspends electricity generation and becomes difficult to be reactivated. Therefore, in the structure described in Patent Document 1, when the oxidation of iron (Fe) progresses and a hydrogen generating ability decreases, it is required to conduct a troublesome task to take out the hydrogen producing member and to replace it with a new one.

$$4H_2O+3Fe \rightarrow 4H_2+Fe_3O_4 \qquad (2)$$

The present invention has been achieved in view of the above-mentioned problems, and an object of the present invention is to provide a fuel cell apparatus which maintains stable performances, can continue the electricity generation for a long term, and has a long service life.

Means for Solving the Problems

The above-mentioned object can be attained by the invention described below.

A fuel cell apparatus is characterized by being equipped with:

a fuel cell body which includes an electricity generating section to generate electricity through a reaction between hydrogen and oxygen, and a hydrogen producing member which produces hydrogen through a reaction with water produced in the course of the electricity generation, and supplies the produced hydrogen to the electricity generating section; and a reduction controller to control so as to reduce the hydrogen producing member oxidized through the reaction with the produced water.

Effect of the Invention

According to the present invention, the structure is equipped with a fuel cell body which includes an electricity generating section to generate electricity through a reaction between hydrogen and oxygen, and a hydrogen producing member which produces hydrogen through a reaction with water produced in the course of the electricity generation, and supplies the produced hydrogen to the electricity generating section; and a reduction controller to control so as to reduce the hydrogen producing member oxidized through the reaction with the produced water. With this structure, in the case where a hydrogen generating ability decreases due to the progress of the oxidation of the hydrogen producing member in the course of electricity generation, the oxidized hydrogen producing member can be reduced and reactivated by the reduction controller. As a result, it becomes possible to attain a fuel cell apparatus which maintains stable performances, can continue the electricity generation for a long term, and has a long service life.

EMBODIMENT FOR IMPLEMENTING THE INVENTING

Hereafter, based on drawings, a fuel cell apparatus in an embodiment of the present invention will be explained. However, the present invention should not be restricted to this embodiment.

Figure 1:
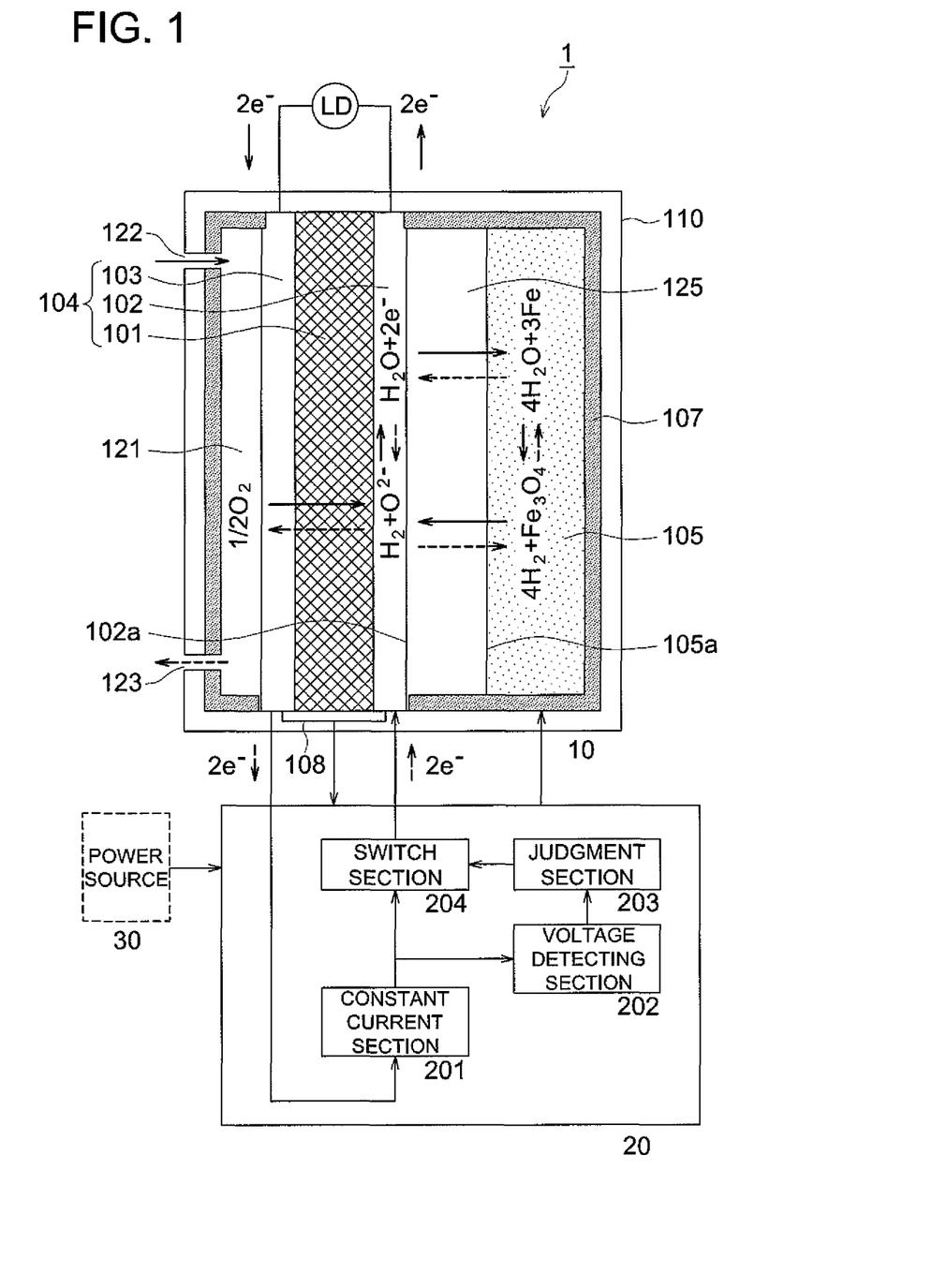
FIG. 1 is a schematic diagram showing an outline structure of a fuel cell apparatus in one embodiment of the present invention.

First, the structure of the fuel cell apparatus in the embodiment will be explained with reference to FIG. 1. FIG. 1 is a schematic diagram showing the outline structure of a fuel cell apparatus 1 in the embodiment.

As shown in FIG. 1, the fuel cell apparatus 1 includes a fuel cell body 10, a reduction controller 20, and the like. In FIG. 1, the fuel cell body 10 is shown by a cross-sectional schematic diagram, and the reduction controller 20 is shown by a block diagram.

The fuel cell body 10 includes an electrolyte membrane 101, a fuel electrode 102, an air electrode (oxygen electrode) 103, a hydrogen producing member 105, a heater 107, a temperature sensor 108, a cover member 110, and the like.

The fuel cell body 10 has a MEA (Membrane Electrode Assembly, membrane electrode joint unit) structure in which the electrolyte membrane 101 is jointed between the fuel electrode 102 and the air electrode 103. An electricity generating section 104 is constituted by these three members of the electrolyte membrane 101, the fuel electrode 102, and the air electrode 103.

At the fuel electrode 102-side, disposed is a hydrogen producing member 105 configured to supply hydrogen being fuel gas to the fuel electrode 102, and at the air electrode 103-side, formed is an air flow passage 121 through which air being oxidant gas is supplied to the air electrode 103. Here, as fuel, hydrogen, methanol, and the like may be used, and as oxidant gas, gas containing oxygen may be used. In this embodiment, hydrogen and air are used as fuel and oxidant gas, respectively.

Examples of the material of the electrolyte membrane 101 include a solid oxide electrolyte employing stabilized yttria zirconium (YSZ), Nafion (trademark of E.I. du Pont de Nemours & Co.), and cationic conductive or anionic conductive solid polymer electrolyte. However, without being limited to the above, the examples further include materials satisfying the characteristics as the electrolyte of a fuel cell, such as materials to allow hydrogen ion to pass through, materials to allow oxygen ion to pass through, and materials to allow hydroxide ion to pass through.

As film forming methods for the electrolyte membrane 101, in the case of solid oxide electrolytes, an electrochemical vapor deposition method (CVD-EVD method; Chemical Vapor Deposition-Electrochemical Vapor Deposition) may be employed, and in the case of solid polymer electrolytes, a coating method may be employed.

Each of the fuel electrode 102 and the air electrode 103 includes a catalyst layer (in which, for example, platinum blacks or platinum alloys are supported on carbon blacks) disposed in contact with the electrolyte membrane 101, and a diffusion electrode, such as a carbon paper laminated on the catalyst layer. As methods for forming the fuel electrode 102 and the air electrode 103, for example, a vapor deposition method may be used.

As the hydrogen producing member 105, Fe or Mg alloy which produces hydrogen by a chemical reaction (for example, oxidation), carbon nanotubes which can absorb and desorb hydrogen with the structure of molecules, and the like may be used. In this embodiment, Fe which produces hydrogen by oxidation is used. Further, the hydrogen producing member 105 may not only generate hydrogen, but also may store (adsorb) hydrogen. In this case, after the hydrogen producing member 105 produces hydrogen from itself, the hydrogen producing member 105 conducts an storage (adsorption) action for the hydrogen, whereby the hydrogen producing member 105 can be used repeatedly. As materials capable of storing hydrogen, a hydrogen storing alloy in which Ni, Fe, Pd, V, Mg, or the like is made as a base material, may be used.

The emission surface 105a of the hydrogen producing member 105 which emits hydrogen, and the supply surface 102a of the fuel electrode 102 to which the hydrogen is supplied, are disposed to face each other, and arranged to be parallel to each other with a predetermined distance between them by a spacer such as beads which is not illustrated in the drawings. The emission surface 105a of the hydrogen producing member 105 is configured to emit hydrogen in a planar form.

Specifically, with a heater 107 arranged so as to come in contact with the entire surface except the emission surface 105a of the hydrogen producing member 105, the temperature of the entire body of the hydrogen producing member 105 is raised uniformly, whereby hydrogen can be emitted in a planar form from the emission surface 105a. Thus, the hydrogen producing member 105 can emit hydrogen from almost the entire surface of its emission surface 105a toward almost the entire surface of the supply surface 102a of the fuel electrode 102.

Further, the hydrogen generation rate of the hydrogen producing member 105 is made approximately constant regardless of locations on the emission surface 105a. Specifically, a thermochemical balance is employed. If the temperature of the hydrogen producing member 105 is raised or lowered, hydrogen corresponding to deviation from an equilibrium condition can be produced. Accordingly, if the temperature of the entire body of the hydrogen producing member 105 is made uniform by use of the heater 107, hydrogen can be produced with a constant rate regardless of locations.

Further, when a chemical equilibrium is used, if a hydrogen concentration in a space portion 125 between the fuel electrode 102 and the hydrogen producing member 105 at the time of start-up of a cell is made constant regardless of locations, also, the hydrogen generating rate of the hydrogen producing member 105 can be made constant. Herein, if a hydrogen concentration at the time of start-up of a cell is made constant regardless of locations, power generated from the electricity generating section 104 becomes constant. That is, the consumption of hydrogen becomes constant regardless of locations. In this case, if the chemical equilibrium deviates due to the consumed hydrogen, hydrogen is newly produced from the hydrogen producing member 105 in accordance with the amount of the deviation. Since the consumption of hydrogen is constant regardless of locations, the hydrogen generating rate from the hydrogen producing member 105 becomes constant regardless of locations.

In this regard, as the method for making the concentration of hydrogen at the time of start-up of a cell to be constant regardless of locations, for example, hydrogen may be encapsulated or charged in a space portion 125 between the fuel electrode 102 and the hydrogen producing member 105 beforehand. The encapsulated hydrogen diffuses naturally, and the concentration in the encapsulated space 125 becomes constant. Accordingly, the concentration of hydrogen can be made constant regardless of locations.

With this, since hydrogen with a uniform concentration can be supplied over the entire surface of the supply surface 102a of the fuel electrode 102, electromotive forces generated on the fuel electrode 102 becomes constant without becoming different depending on the locations on the fuel electrode 102. As a result, it becomes possible to suppress lowering of the output due to dispersion in electromotive force, and to enhance fuel efficiency. Furthermore, the hydrogen generation rate of the hydrogen producing member 105 is made to be almost constant regardless of the locations on the emission surface 105a, it becomes possible to suppress more lowering of the output due to dispersion in electromotive force, and to enhance more fuel efficiency.

In this embodiment, the emission surface 105a of the hydrogen producing member 105 which emits hydrogen, and the supply surface 102a of the fuel electrode 102 to which the hydrogen is supplied, are disposed to face each other, and arranged to be parallel to each other with a predetermined distance. However, the emission surface 105a and the supply surface 102a may be superimposed so as to be in close contact to each other. In this case, since hydrogen with a more uniform concentration can be supplied over the entire surface of the supply surface 102a of the fuel electrode 102, it becomes possible to more effectively suppress lowering of the output due to dispersion in electromotive force, and to enhance more fuel efficiency.

A cover member 110 is a container to cover the fuel cell body 10, and at its air electrode 103 side, an air supply port 122 to supply air to the air flow passage 121 and an air discharge port 123 to discharge excess air are disposed. By introduction of air from the air supply port 122 to the air flow passage 121, air can be supplied and dispersed to the entire body of the air electrode 103.

In the fuel cell body 10 with such a structure, hydrogen is supplied and dispersed from the hydrogen producing member 105 to the fuel electrode 102, and air is supplied and dispersed from the air flow passage 121 to the air electrode 103, whereby an electrochemical reaction is caused so as to generate electricity. Further, at this time, iron (Fe) being the hydrogen producing member 105 is oxidized and changes to iron oxide ($Fe_3O_4$), and the percentage of iron (Fe) in the hydrogen producing member 105 gradually decreases. In this connection, the power generation action will be described later in detail.

The reduction controller 20 includes a constant current section 201, a voltage detecting section 202, a judgment section 203, a switch section 204, and the like. At the time of suspension of power generation, in the fuel cell body 10, the reduction controller 20 is configured to reduce and reactivate the hydrogen producing member 105 in which oxidation progresses with the generation of electricity.

Specifically, the reduction controller 20 makes the oxidized hydrogen producing member 105 ($Fe_3O_4$) react with hydrogen ($H_2$) produced by electrolysis of water ($H_2O$) produced in the fuel cell body 10 during the electricity generation by the fuel cell body 10, whereby the oxidized hydrogen producing member 105 ($Fe_3O_4$) is reduced.

The constant current section 201 supplies electric power to be used for electrolysis to the fuel cell body 10. The voltage detecting section 202 detects the output voltage of the constant current section 201. The judgment section 203 controls the switch section 204 based on the detection result of the voltage detecting section 202, and turns on and off the supply of the electric power from the constant current section 201 to the fuel cell body 10. At the time of the reduction action, the reduction controller 20 is connected to the power source 30 provided at the outside, whereby electric power is supplied to the reduction controller 20. In this connection, the reduction action will be explained in detail later.

Here, an electricity generating action and a reactivating (reducing) action performed in the fuel cell apparatus 1 here will be explained in detail with reference to FIG. 2. FIGS. 2A to 2D are schematic diagrams showing the flow of the electricity generating action and the reducing action performed in the fuel cell apparatus 1.

(Electricity Generating Action)

Figure 2:
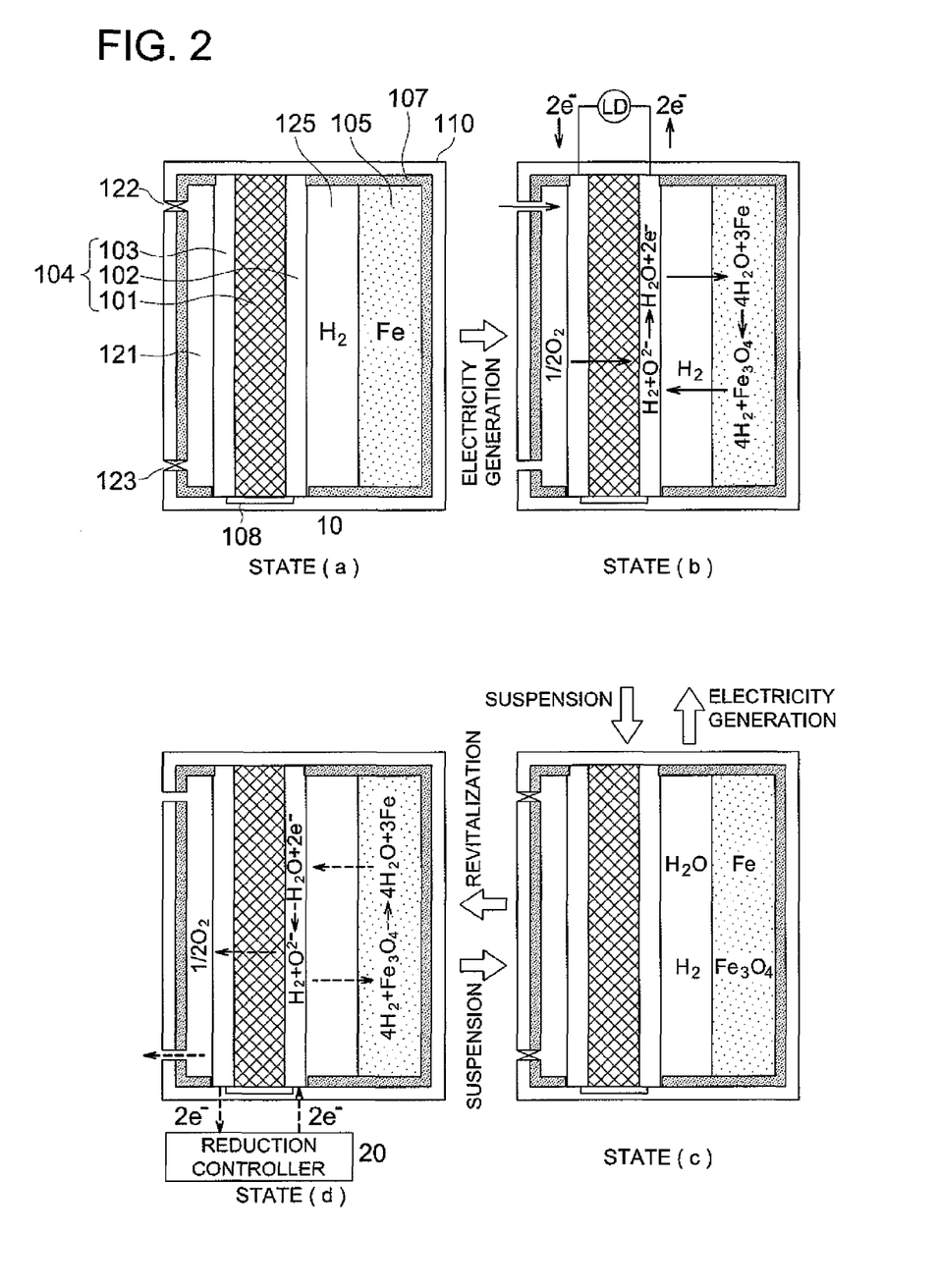
FIG. 2 is a schematic diagram showing a flow of an electricity generating action and a reducing action which are performed in the fuel cell apparatus in the embodiment of the present invention.

First, as shown in a state (a) in FIG. 2, in an initial state of electricity generation, hydrogen ($H_2$) is encapsulated in the space portion 125 in the fuel cell body 10.

Next, as shown in a state (b) in FIG. 2, when the air supply port 122 is opened and air is supplied to the air electrode 103 through the air flow passage 121, in the fuel electrode 102, a reaction shown in the following formula (1) is caused between hydrogen ($H_2$) encapsulated in the space portion 125 and oxygen ion ($O^{2-}$) which is ionized in the air electrode 103 and passes through the electrolyte membrane 101, whereby electrons ($e^-$) are generated and accumulated. That is, electromotive force is caused so that electricity is generated. If a load LD is connected between the fuel electrode 102 and the air electrode 103, the electrons ($e^-$) accumulated in the fuel electrode 102 flow into the air electrode 103 and can drive the load LD.

$$H^2 + O^{2-} \rightarrow H_2O + 2e^- \tag{1}$$

Further, at this time, as shown with the formula (1), water ($H_2O$) is produced by the fuel electrode 102. The produced water ($H_2O$) is supplied to the hydrogen producing member 105 (Fe), and then in the hydrogen producing member 105 (Fe), the reaction shown in the following formula (2) is caused by the supplied water ($H_2O$), and hydrogen ($H_2$) is produced. Successively, the produced hydrogen ($H_2$) is supplied to the fuel electrode 102, and than in the fuel electrode 102, the supplied hydrogen ($H_2$) is oxidized so as to generate electricity, whereby water ($H_2O$) is produced again, and the above cyclical processes are utilized such that the electricity generating action is continued.

In this way, the fuel electrode 102 and the hydrogen producing member 105 (Fe) are arranged to face each other, and the cyclical utilization of hydrogen ($H_2$) and water ($H_2O$) is performed between them. Accordingly, it is not necessary to provide an introducing mechanism for circulating hydrogen ($H_2$) and water ($H_2O$) at the outside of the fuel cell body 10. As a result, it becomes possible to miniaturize a fuel cell apparatus and to reduce cost.

$$4H_2O + 3Fe \rightarrow 4H_2 + Fe_3O_4 \quad (2)$$

At this time, in the hydrogen producing member 105, iron (Fe) is oxidized, and changes to iron oxide ($Fe_3O_4$), and the percentage of the iron (Fe) in the hydrogen producing member 105 decreases gradually.

In such a condition, as shown in a state (c) in FIG. 2, when the air supply port 122 is closed and the supply of air to the air electrode 103 is suspended, the electricity generation can be suspended. At this time, the water ($H_2O$) and the hydrogen ($H_2$) produced respectively by the reactions of the above-mentioned formula (1) and formula (2) remain in the space portion 125.

(Reducing Action)

At the time of suspension of electricity generation in the fuel cell body 10, in the state (c) shown in FIG. 2C, when the reduction controller 20 applies a voltage and energizes between the fuel electrode 102 and the air electrode 103 in the fuel cell body 10 as shown in a state (d) in FIG. 2, in the fuel electrode 102, a reaction shown in the following formula (3) is caused between the water ($H_2O$) remaining in the space portion 125 and electrons ($e^-$) supplied by energizing, whereby hydrogen ($H_2$) is produced by electrolysis.

$$H_2O + 2e^- \rightarrow H_2 + O^{2-} \quad (3)$$

Successively, the produced hydrogen ($H_2$) is supplied to the hydrogen producing member 105, and then in the hydrogen producing member 105, a reaction shown in the following formula (4) is caused by the supplied hydrogen ($H_2$), whereby the iron oxide ($Fe_3O_4$) in the hydrogen producing member 105 is reduced and changes to iron (Fe). As a result, the percentage of the iron (Fe) in the hydrogen producing member 105 increases gradually, so that the hydrogen producing member 105 is reactivated.

$$4H_2 + Fe_3O_4 \rightarrow 4H_2O + 3Fe \quad (4)$$

At this time, as shown with the formula (4), water ($H_2O$) is produced by the hydrogen producing member 105. The produced water ($H_2O$) is supplied to the fuel electrode 102, and then in the fuel electrode 102, the supplied water ($H_2O$) is electrolyzed, whereby hydrogen ($H_2$) is produced again, and the above cyclical processes are utilized so that the reducing action is continued.

Incidentally, in such a reducing action, it is important to determine when the reduction reaction should be suspended. Since the reduction reaction is also an endothermic reaction, in order to promote the reaction, it is required to heat continuously at high temperature. However, if the reduction reaction is continued for a long time, such an operation exerts an influence to devices in which the fuel cell apparatus 1 is installed. Moreover, an excessive reduction reaction may cause problems so as to deteriorate the characteristics of the fuel electrode 102, the air electrode 103, the hydrogen producing member 105, and the like. For this reason, it is necessary to control the reduction reaction appropriately. Hereafter, a reduction reaction control method performed in the fuel cell apparatus 1 will be explained.

(Reduction Reaction Control Method 1)

Figure 3:
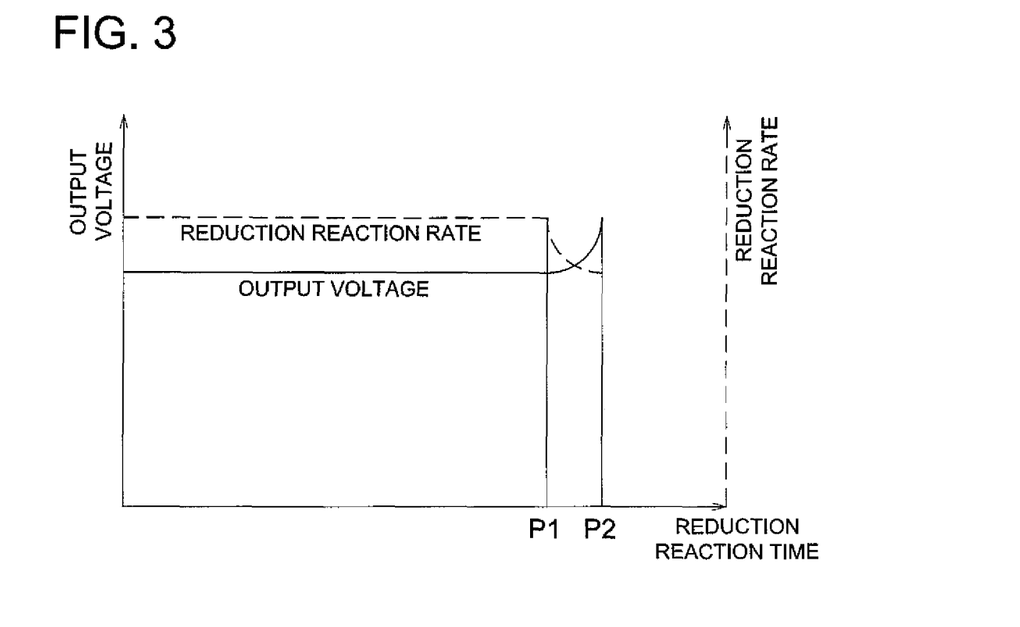
FIG. 3 is a schematic diagram showing a relationship of each of a reduction reaction rate and an output voltage of a constant current section to a reduction reaction time according to one example of a reduction reaction control method in the embodiment of the present invention.

An example of the reduction reaction control method will be explained with reference to FIGS. 1 and 3. FIG. 3 is a schematic diagram showing a relationship between a reduction reaction time and each of a reduction reaction speed and the output voltage of the constant current section 201.

When iron oxide ($Fe_3O_4$) changes to iron (Fe) in a predetermined amount (in FIG. 3, a P1 point), the reduction reaction speed in the hydrogen producing member 105 will decrease. With the decrease of the reduction reaction speed, the production rate of water decreases, and then the supply speed of water to the fuel electrode 102 decreases. As a result, the speed of the electrolysis performed in the fuel electrode 102 decreases, and electrons ($e-$) are not likely to flow. Successively, the flow of electrons becomes difficult, which results in that the output voltage of the constant current section 201 will rise.

That is, the percentage of iron (Fe) in the hydrogen producing member 105, i.e., the reduction reaction time and the reduction reaction speed have a given relationship, and the reduction reaction speed and the output voltage of the constant current section 201 have a given relationship.

Then, the judgment section 203 compares the amount of change of the output voltage of the constant current section 201 detected by the voltage detecting section 202 per the reduction reaction time with a threshold value set preliminarily. When the amount of change exceeds the threshold value (in FIG. 3, at a P2 point), the judgment section 203 suspends the supply of electric power from the constant current section 201 to the fuel cell body 10. With this, the reducing action is suspended.

In this way, in the reduction reaction control method 1, when the amount of change of the output voltage of the constant current section 201 per time exceeds the threshold value, that is, when the iron oxide ($Fe_3O_4$) in the hydrogen producing member 105 changes to iron (Fe) by a predetermined amount, the reduction action is suspended. Accordingly, an excessive reduction reaction can be prevented.

(Reduction Reaction Control Method 2)

Figure 4:
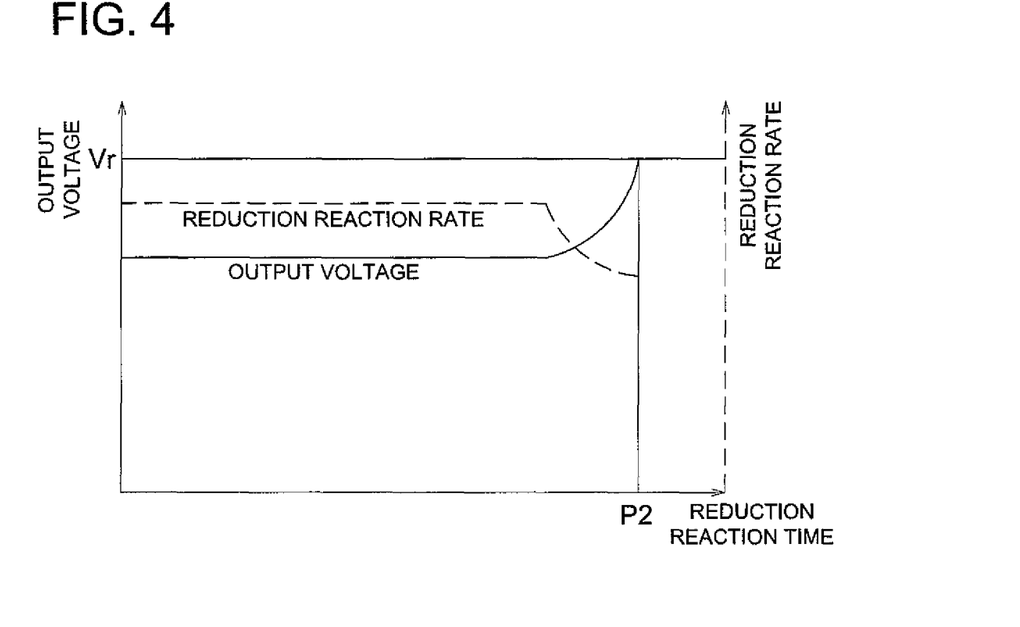
FIG. 4 is a schematic diagram showing a relationship of each of a reduction reaction rate and an output voltage of a constant current section to a reduction reaction time according to another example of a reduction reaction control method in the embodiment of the present invention.

Another example of the reduction reaction control method will be explained with reference to FIGS. 1 and 4. FIG. 4 is a schematic diagram showing a relationship between a reduction reaction time and each of a reduction reaction rate and the output voltage of the constant current section 201. In this connection, since the relationship between a reduction reaction time and each of a reduction reaction rate and the output voltage of the constant current section 201 in FIG. 4 is the same as the case in FIG. 3, the explanation for that is omitted.

There exists an upper limit in the voltage which can be applied to the fuel electrode 102. Basically, electrons ($e^-$) may be supplied from the constant current section 201 to the fuel electrode 102 such that only oxygen ions ($O^{2-}$) required for the chemical reaction (reduction) performed in the fuel cell body 10 are made to pass through the electrolyte membrane 101. However, if the voltage applied to the fuel electrode 102 exceeds this upper limit, electrons ($e^-$) which do not contribute to reduction flow out from the fuel electrode 102, and the fuel electrode 102 may deteriorate.

To avoid this the judgment section 203 compares the output voltage of the constant current section 201 detected by the voltage detecting section 202 with a threshold value Vr (an upper limit) set preliminarily. When the output voltage exceeds the threshold value Vr (in FIG. 4, at a P2 point), the judgment section 203 controls the switch section 204 to suspend the supply of electric power from the constant current section 201 to the fuel cell body 10. With this, the reduction action is suspended.

In this way, in the reduction reaction control method 2, when the output voltage of the constant current section 201 exceeds the threshold value Vr (the upper limit), that is, when the iron oxide ($Fe_3O_4$) in the hydrogen producing member 105 changes to iron (Fe) by a predetermined amount, the reduction action is suspended. Accordingly, an excessive reduction reaction can be prevented.

Thus, the fuel cell apparatus 1 in the embodiment of the present invention includes the fuel cell body 10 having the hydrogen producing member 105 which produces hydrogen ($H_2$) through a reaction with water ($H_2O$) produced by the electricity generation and supplies the produced hydrogen ($H_2$) to the fuel electrode 102, and the reduction controller 20 which reduces the hydrogen producing member 105 ($Fe_3O_4$) oxidized by the reaction with water ($H_2O$) in the fuel cell body 10. With this, when a hydrogen generating ability decreases according to the progress of oxidation of the hydrogen producing member 105 (Fe) with the generation of electricity, the oxidized hydrogen producing member 105 ($Fe_3O_4$) can be reduced and reactivated by the reduction controller 20. As a result, it becomes possible to maintain the stable performance, and to attain the fuel cell apparatus 1 which can continue the electricity generation for a long term and has a long service life.

Moreover, in the reducing action, when the amount of change of the output voltage of the constant current section 201 per time exceeds the threshold value, or when the output voltage of the constant current section 201 exceeds the threshold value Vr (the upper limit), that is, when the iron oxide ($Fe_3O_4$) in the hydrogen producing member 105 changes to iron (Fe) by a predetermined amount, the reduction action is suspended. Accordingly, an excessive reduction reaction can be prevented. As a result, safety and the high performance can be maintained.

EXPLANATION OF REFERENCE SYMBOLS

1 Fuel cell apparatus
10 Fuel cell body
101 Electrolyte membrane
102 Fuel electrode
103 Air electrode
104 Electricity generating section
105 Hydrogen producing member
107 Heater
108 Temperature sensor
110 Cover member
121 Air flow passage
122 Air supply port
123 Air discharge port
125 Space portion
20 Reduction controller
201 Constant current section
202 Voltage detecting section
203 Judgment section
204 Switch section
30 Power source
LD Load

The invention claimed is:

1. A fuel cell apparatus, comprising;
   (a) a fuel cell body including
      a fuel cell power section configured to generate power through a chemical reaction of hydrogen and oxygen, and
      a hydrogen producing member configured to produce hydrogen through a chemical reaction with water and supply the hydrogen to the fuel cell power section for power generation, said water being produced in the fuel cell power section at the time of power generation,
      wherein the hydrogen producing member is adapted to be regenerated by a reduction reaction with hydrogen, said hydrogen being produced by the electrolysis of water in the fuel cell power section; and
   (b) a controller configured to supply electricity to the fuel cell power section to electrolyze water, said water being generated in the reduction reaction of the hydrogen producing member,
      wherein the controller is configured to detect change of speed of reduction of the hydrogen producing member and control reduction of the hydrogen producing member by controlling supply to the fuel power section of the electricity supplied in said electrolysis of water, based on the detected change of speed of reduction.

2. The fuel cell apparatus of claim 1, wherein the fuel cell power section includes a fuel electrode, and
   wherein the hydrogen producing member is arranged in contact with the fuel electrode or facing the fuel electrode with a predetermined space therebetween, the hydrogen producing member supplying the hydrogen produced through a chemical reaction with the water to the fuel electrode.

3. The fuel cell apparatus of claim 1, wherein the controller includes a constant current section configured to supply the electricity and detects change of speed of reduction based on an output voltage from the constant current section.

4. The fuel cell apparatus of claim 3, wherein the controller is configured to suspend supply of the electricity when a change ratio of the output voltage of the constant current section in a unit time exceeds a predetermined value.

5. The fuel cell apparatus of claim 3, wherein the controller is configured to suspend supply of the electricity when the output voltage of the constant current section exceeds a predetermined value.

6. The fuel cell apparatus of claim 1, wherein the fuel power section further includes an oxygen electrode and an electrolyte membrane held between the oxygen electrode and the fuel electrode, and produces electricity through a chemical reaction of hydrogen supplied to the fuel electrode and oxygen supplied to the oxygen electrode.

7. The fuel cell apparatus of claim 1, wherein the hydrogen producing member includes a metal or an alloy to produce hydrogen by the chemical reaction with the water.

8. The fuel cell apparatus of claim 1, further comprising a heating unit surrounding the hydrogen producing member except an area emitting the hydrogen, the heating unit being configured to facilitate emission of the hydrogen by heating the hydrogen producing member.

9. A fuel cell apparatus, comprising;
   (a) a fuel cell body including
      a fuel cell power section having an electrolyte membrane held between a fuel electrode and an oxygen electrode and produces electricity through a chemical reaction of hydrogen supplied to the fuel electrode and oxygen supplied to the oxygen electrode, and
      a hydrogen producing member configured to produce hydrogen through a chemical reaction with water produced through the chemical reaction of hydrogen and oxygen in the fuel cell power section and supply the produced hydrogen to the fuel electrode for power generation, wherein the hydrogen producing member is adapted to be regenerated by a reduction reaction with hydrogen, said hydrogen being produced by the electrolysis of water at the fuel electrode; and (b) a controller configured to supply electricity to the fuel cell power section to electrolyze water, said water being generated in the reduction reaction of the hydrogen producing member, wherein the controller is configured to detect change of speed of reduction of the hydrogen producing member and control reduction of the hydrogen producing member by controlling supply of the electricity to the fuel power section during said electrolysis of water, based on the detected change of speed of reduction.

10. The fuel cell apparatus of claim 9, wherein the hydrogen producing member is arranged in contact with the fuel electrode or facing the fuel electrode with a predetermined space therebetween and supplies the hydrogen produced through a chemical reaction with the water to the fuel electrode.

11. The fuel cell apparatus of claim 9, wherein the controller includes a constant current section configured to supply the electricity and detects change of speed of reduction based on an output voltage from the constant current section.

12. The fuel cell apparatus of claim 11, wherein the controller is configured to suspend supply of the electricity when a change ratio of the output voltage of the constant current section in a unit time exceeds a predetermined value.

13. The fuel cell apparatus of claim 11, wherein the controller is configured to suspend supply of the electricity when the output voltage of the constant current section exceeds a predetermined value.

14. A fuel cell apparatus, comprising;
(a) a fuel cell body including
a fuel cell power section having a fuel electrode and configured to produce electricity through a chemical reaction of hydrogen and oxygen, and
a hydrogen producing member arranged in contact with the fuel electrode or facing the fuel electrode with a predetermined space therebetween and configured to produce hydrogen through a chemical reaction with water produced through the chemical reaction of hydrogen and oxygen in the fuel cell power section and supply the hydrogen to the fuel electrode, wherein the hydrogen producing member is adapted to be regenerated by a reduction reaction with hydrogen, said hydrogen being produced by the electrolysis of water at the fuel electrode; and (b) a controller configured to supply electricity to the fuel power section to electrolyze water, said water being generated in the reduction reaction of the hydrogen producing member, wherein the controller is configured to detect change of speed of reduction of the hydrogen producing member and control reduction of the hydrogen producing member by controlling supply of the electricity to the fuel power section during said electrolysis of water, based on the detected change of speed of reduction.

15. The fuel cell apparatus of claim 14, wherein the controller includes a constant current section configured to supply the electricity and detects change of speed of reduction based on an output voltage from the constant current section.

16. The fuel cell apparatus of claim 15, wherein the controller is configured to suspend supply of the electricity when a change ratio of the output voltage of the constant current section in a unit time exceeds a predetermined value.

17. The fuel cell apparatus of claim 15, wherein the controller is configured to suspend supply of the electricity when the output voltage of the constant current section exceeds a predetermined value.

* * * * *